(12) United States Patent
Hwang et al.

(10) Patent No.: US 12,627,469 B2
(45) Date of Patent: May 12, 2026

(54) ELECTRONIC DEVICE FOR STORING SECURE DATA AND METHOD FOR OPERATING THE SAME

(71) Applicant: SAMSUNG ELECTRONICS CO., LTD., Suwon-si (KR)

(72) Inventors: Jinha Hwang, Suwon-si (KR); Inho Kim, Suwon-si (KR); Dongsun Lee, Suwon-si (KR); Jaemin Ryu, Suwon-si (KR); Kyungim Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 92 days.

(21) Appl. No.: 18/520,023

(22) Filed: Nov. 27, 2023

(65) Prior Publication Data

US 2024/0178990 A1     May 30, 2024

Related U.S. Application Data

(63) Continuation of application No. PCT/KR2023/018740, filed on Nov. 21, 2023.

(30) Foreign Application Priority Data

Nov. 25, 2022     (KR) ........................ 10-2022-0160173

(51) Int. Cl.
| | |
|---|---|
| H04L 29/00 | (2006.01) |
| G06F 21/60 | (2013.01) |
| H04L 9/06 | (2006.01) |

(52) U.S. Cl.
CPC .......... H04L 9/0637 (2013.01); G06F 21/602 (2013.01); H04L 9/0631 (2013.01)

(58) Field of Classification Search
CPC .... H04L 9/0637; H04L 9/0631; G06F 21/602
(Continued)

(56) References Cited

U.S. PATENT DOCUMENTS

| | | | | |
|---|---|---|---|---|
| 8,332,653 B2 * | 12/2012 | Buer | ...................... | G06F 21/575 |
| | | | | 713/193 |
| 9,753,868 B2 * | 9/2017 | Yamada | .................. | G06F 21/64 |

(Continued)

FOREIGN PATENT DOCUMENTS

| | | |
|---|---|---|
| CN | 113553204 A | 10/2021 |
| KR | 10-2016-0141462 A | 12/2016 |

(Continued)

OTHER PUBLICATIONS

International Search Report and Written Opinion (PCT/ISA/210 and PCT/ISA/237) dated Feb. 26, 2024, issued by International Searching Authority for International Application No. PCT/KR2023/018740.

(Continued)

*Primary Examiner* — Brandon Hoffman
*Assistant Examiner* — Michael D Anderson
(74) *Attorney, Agent, or Firm* — Sughrue Mion, PLLC

(57) ABSTRACT

An electronic device comprises: a first processor operating in a general non-secure environment; a second processor operating in a secure environment; a first memory allocated to the general non-secure environment; a second memory allocated to the secure environment; and a third memory shared in the general non-secure environment and the secure environment, wherein the second processor is configured to: encrypt at least a portion of secure data to generate an encrypted portion, the secure data generated by a trusted application executed in the secure environment, store the encrypted portion in the third memory, and store first information used to encrypt the at least a portion of the secure data and second information generated while encrypting the at least the portion of the secure data in the second memory, and wherein the first processor is configured to, store the (Continued)

encrypted portion stored in the third memory in the first memory.

18 Claims, 9 Drawing Sheets

(58) Field of Classification Search
USPC ........................................................ 713/190
See application file for complete search history.

(56) References Cited

U.S. PATENT DOCUMENTS

| | | |
|---|---|---|
| 10,700,865 B1 | 6/2020 | Hendrick et al. |
| 2006/0090084 A1 | 4/2006 | Buer |
| 2008/0320263 A1 | 12/2008 | Nemiroff et al. |
| 2013/0042295 A1 | 2/2013 | Kelly et al. |
| 2014/0189370 A1 | 7/2014 | Jang et al. |
| 2014/0223197 A1 | 8/2014 | Gueron et al. |
| 2017/0048714 A1 | 2/2017 | Attfield et al. |
| 2017/0317990 A1 | 11/2017 | Kim et al. |
| 2019/0050347 A1* | 2/2019 | Bolotov .............. G06F 12/1408 |
| 2020/0304295 A1 | 9/2020 | Paudyal et al. |
| 2020/0358620 A1 | 11/2020 | Kim et al. |
| 2021/0357514 A1 | 11/2021 | Agarwal et al. |
| 2022/0006653 A1 | 1/2022 | Ghetie |
| 2022/0156411 A1 | 5/2022 | Benoit et al. |

FOREIGN PATENT DOCUMENTS

| | | |
|---|---|---|
| KR | 10-2017-0124360 A | 11/2017 |
| KR | 10-2020-0129776 A | 11/2020 |
| KR | 10-2022-0062866 A | 5/2022 |

OTHER PUBLICATIONS

Extended European Search Report dated Oct. 14, 2025, issued by the European Patent Office in European Application No. 23894985.3.

* cited by examiner

START

*500*

EXECUTE TRUSTED APPLICATION
TO GENERATE SECURE DATA ~501

ENCRYPT SECURE DATA, COPY TO SECOND MEMORY,
AND STORE INFORMATION REQUIRED FOR
DECRYPTING SECURE DATA IN FOURTH MEMORY ~503

STORE ENCRYPTED SECURE DATA COPIED
TO SECOND MEMORY IN FIRST MEMORY ~505

END

ELECTRONIC DEVICE FOR STORING SECURE DATA AND METHOD FOR OPERATING THE SAME

CROSS-REFERENCE TO RELATED APPLICATIONS

This application is a continuation application of International Application No. PCT/KR2023/018740, filed on Nov. 21, 2023, which claims priority to Korean Patent Application No. 10-2022-0160173, filed on Nov. 25, 2022, in the Korean Intellectual Property Office, the disclosures of which are incorporated by reference herein their entireties.

BACKGROUND

1. Field

The disclosure relates to an electronic device for storing secure data and a method for operating the same.

2. Description of Related Art

In a wireless communication system, an electronic device (e.g., user equipment (UE)) may access a wireless communication network and use a voice communication service or a data communication service in a fixed position or on the move. More and more services and additional functions as well as voice communication services or data communication services are being provided through electronic devices. To provide various services and additional functions to an electronic device, an appropriate authentication process is required, and data requiring security needs to be safely processed.

In general, a universal integrated circuit card (UICC) is inserted into the electronic device, and authentication is performed between the electronic device and the server of the mobile network operator (MNO) through a universal subscriber identity module (USIM) installed in the UICC. If the user of the electronic device subscribes to a wireless communication service provided by the MNO, the MNO may provide a UICC (e.g., a SIM card or a USIM card) to the user. The user may insert the provided UICC into his or her electronic device. Recently, there has been proposed new type of UICC referred to as an embedded UICC (eUICC) configured to remotely install a profile for providing a communication service through a network without replacing the UICC even when the user changes a communication carrier. The eUICC may be manufactured as a pre-mounted UICC chip fixed in the terminal during the terminal manufacturing process. An integrated SIM (iSIM), which is more advanced than the eUICC, has been proposed in which the SIM function is integrated into the hardware of the electronic device and configured in the form of a system on chip (SOC).

The iSIM may be used in various electronic devices that may have a structure in which physical attachment/detachment of the UICC is not easy, such as machine-to-machine (M2M) or device-to-device (D2D) terminals and Internet-of-things (IOT) devices as well as regular wireless terminals such as mobile phones.

SUMMARY

According to one or more embodiments, an electronic device comprises: a first processor operating in a general non-secure environment: a second processor operating in a secure environment; a first memory allocated to the general non-secure environment; a second memory allocated to the secure environment; and a third memory shared in the general non-secure environment and the secure environment, wherein the second processor is configured to: encrypt at least a portion of secure data to generate an encrypted portion, the secure data generated by a trusted application executed in the secure environment, store the encrypted portion in the third memory, and store first information used to encrypt the at least a portion of the secure data and second information generated while encrypting the at least the portion of the secure data in the second memory, and wherein the first processor is configured to, store the encrypted portion stored in the third memory in the first memory.

According to one or more embodiments, a method for operating an electronic device, the method comprising: executing a trusted application in a secure environment and generating secure data by a first processor operating in the secure environment: encrypting, by the first processor, at least a portion of the generated secure data to generate an encrypted portion and storing the encrypted portion in a first memory shared in the secure environment and a general non-secure environment: storing, by the first processor, first information used to encrypt the at least the portion of the secure data and second information generated while encrypting the at least the portion of the secure data in a second memory allocated to the secure environment: and storing, by a second processor operating in the general non-secure environment, the encrypted portion stored in the first memory in a third memory allocated to the general non-secure environment.

According to one or more embodiments, a non-transitory computer readable medium having instructions stored therein which when executed by at least one processor in an electronic device cause the at least one processor to execute a method for operating an electronic device, the method comprising: executing a trusted application in a secure environment and generating secure data: encrypting at least a portion of the generated secure data to generate an encrypted portion and storing the encrypted portion in a first memory shared in the secure environment and a general non-secure environment: storing first information used to encrypt the at least the portion of the secure data and second information generated while encrypting the at least the portion of the secure data in a second memory allocated to the secure environment; and storing, the encrypted portion stored in the first memory in a third memory allocated to the general non-secure environment.

DETAILED DESCRIPTION

Figure 1:
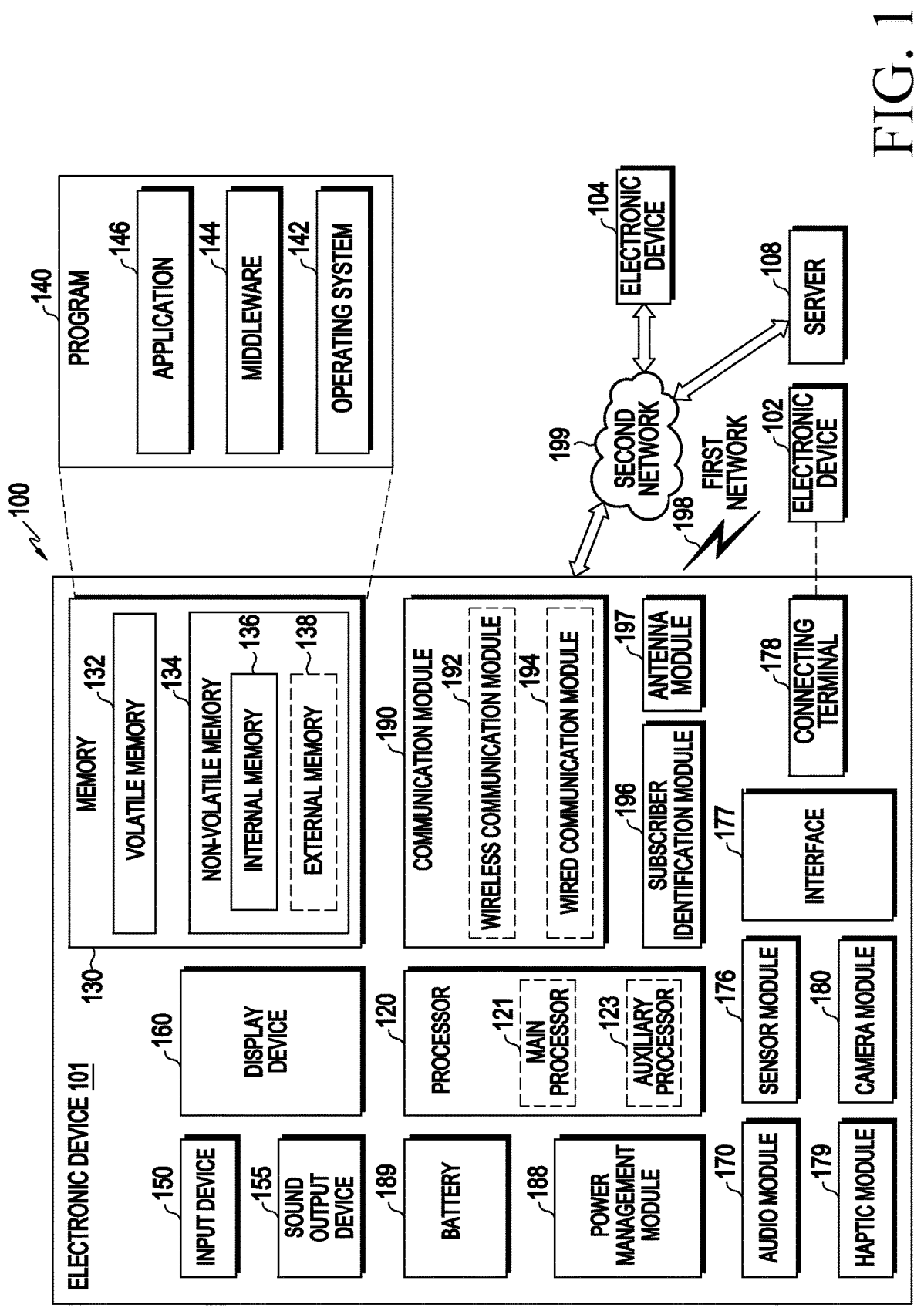
FIG. 1 is a block diagram illustrating an electronic device 100 in a network environment according to one or more embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to one or more embodiments, the electronic device 101 may communicate with the electronic device 104 via the server 108. According to one or more embodiments, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In one or more embodiments, at least one (e.g., the connecting terminal 178) of the components may be omitted from the electronic device 101, or one or more other components may be added in the electronic device 101. According to one or more embodiments, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one or more embodiments, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to one or more embodiments, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to one or more embodiments, the auxiliary processor 123 (e.g., an image signal processor or a communication processor) may be implemented as part of another component (e.g., the camera module 180 or the communication module 190) functionally related to the auxiliary processor 123. According to one or more embodiments, the auxiliary processor 123 (e.g., the neural processing unit) may include a hardware structure specified for artificial intelligence model processing. The artificial intelligence model may be generated via machine learning. Such learning may be performed, for example, by the electronic device 101 where the artificial intelligence is performed or via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to one or more embodiments, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to one or more embodiments, the display 160 may include a touch sensor configured to detect a touch, or a pressure sensor configured to measure the intensity of a force generated by the touch.

The audio module 170 may convert a sound into an electrical signal and vice versa. According to one or more embodiments, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to one or more embodiments, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to one or more embodiments, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to one or more embodiments, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to one or more embodiments, the haptic module 179 may include, for example, a motor, a piezoelectric element, or an electric stimulator.

The camera module 180 may capture a still image or moving images. According to one or more embodiments, the camera module 180 may include one or more lenses, image sensors, image signal processors, or flashes.

The power management module 188 may manage power supplied to the electronic device 101. According to one or more embodiments, the power management module 188 may be implemented as at least part of, for example, a power management integrated circuit (PMIC).

The battery 189 may supply power to at least one component of the electronic device 101. According to one or more embodiments, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to one or more embodiments, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, for example, new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, for example, a high data transmission rate. The wireless communication module 192 may support various technologies for securing performance on a high-frequency band, such as, for example, beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to one or more embodiments, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to one or more embodiments, the antenna module 197 may include one antenna including a radiator formed of a conductor or conductive pattern formed on a substrate (e.g., a printed circuit board (PCB)). According to one or more embodiments, the antenna module 197 may include a plurality of antennas (e.g., an antenna array). In this case, at least one antenna appropriate for a communication scheme used in a communication network, such as the first network 198 or the second network 199, may be selected from the plurality of antennas by, for example, the communication module 190. The signal or the power may then be transmitted or received between the communication module 190 and the external electronic device via the selected at least one antenna. According to one or more embodiments, other parts (e.g., radio frequency integrated circuit (RFIC)) than the radiator may be further formed as part of the antenna module 197.

According to one or more embodiments, the antenna module 197 may form a mmWave antenna module. According to one or more embodiments, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one or more embodiments, instructions or data may be transmitted or received between the electronic device 101 and the external electronic device 104 via the server 108 coupled with the second network 199. The external electronic devices 102 or 104 each may be a device of the same or a different type from the electronic device 101. According to one or more embodiments, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, for example, distributed computing or mobile edge computing. In one or more embodiments, the external electronic device 104 may include an internet-of-things (IOT) device. The server 108 may be an intelligent server using machine learning and/or a neural network. According to one or more embodiments, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
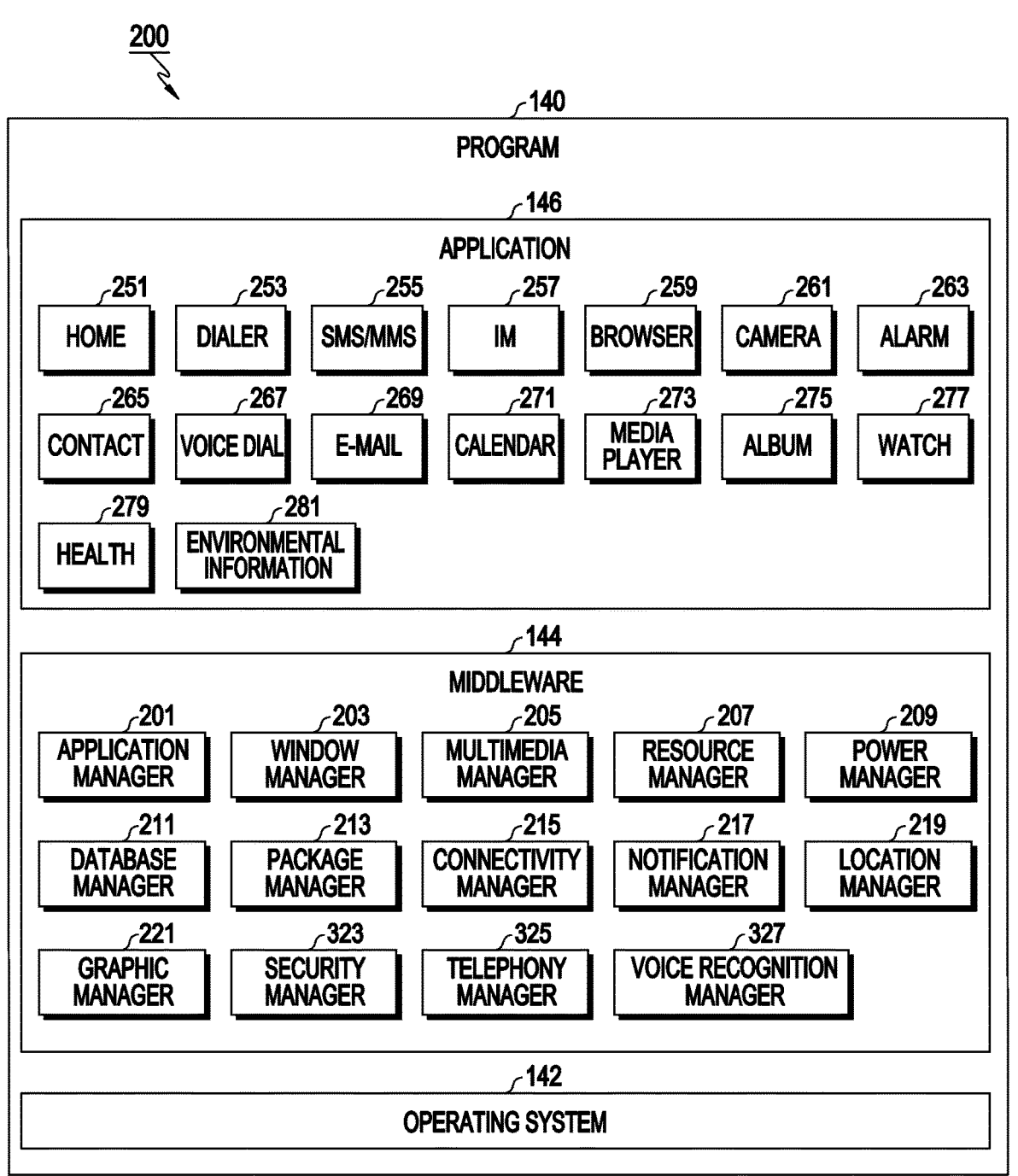
FIG. 2 is a block diagram illustrating a program according to one or more embodiments.

FIG. 2 is a block diagram 200 illustrating a program 140 according to one or more embodiments. According to one or more embodiments, the program 140 may include an operating system (OS) 142 to control one or more resources of the electronic device 101, middleware 144, or an application 146 executable on the OS 142. The OS 142 may include, for example, Android™, iOS™, Windows™, Symbian™, Tizen™, or Bada™. At least part of the program 140 may be pre-loaded on the electronic device 101 (e.g., upon manufacture), or may be downloaded or updated by an external electronic device (e.g., the electronic device 102 or 104 or the server 108) in an environment in which the user uses the electronic device.

The OS 142 may control (e.g., allocate or recover) system resources (e.g., the processor, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 so that the application 146 may use functions or information provided from one or more resources of the electronic device 101. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227. The application manager 201, for example, may manage the life cycle of the application 146. The window manager 203 may manage, for example, graphical user interface (GUI) resources that are used on the screen. The multimedia manager 205 may grasp, for example, formats necessary to play media files and encode or decode the media files using a codec appropriate for the corresponding formats. The resource manager 207 may manage, for example, the source code or memory space of the application 146. The power manager 209 may manage, for example, the capacity, temperature, or power of the battery and determine and provide power information necessary for the operation of the electronic device 101 using a corresponding piece of information of such. According to one or more embodiments, the power manager 209 may interwork with a basic input/output system (BIOS).

The database manager 211 may generate, search, or vary a database to be used in the applications 146. The package manager 213, for example, may manage installation or update of an application that is distributed in the form of a package file. The connectivity manager 215 may manage, for example, wireless or wired connection between the electronic device 101 and an external electronic device. The notification manager 217 may provide, for example, a function for notifying a user of an event (e.g., a call, message, or alert) that occurs. The location manager 219, for example, may manage locational information on the electronic device 101. The graphic manager 221 may manage, for example, graphic effects to be offered to the user and their related user interface. The security manager 223, for example, may provide system security or user authentication. The telephony manager 225 may manage, for example, a voice call or video call function of the electronic device 101. The voice recognition manager 227 may transmit, for example, a user's voice data to the server 108 and receive a command corresponding to a function to be executed on the electronic device 101 based on the voice data or text data converted based on the voice data. According to one or more embodiments, the middleware 244 may dynamically delete some existing components or add new components. According to one or more embodiments, at least part of the middleware 144 may be included as part of the OS 142 or may be implemented in separate software from the OS 142.

The application 146 may include, for example, an application, such as a home 251, a dialer 253, an SMS/MMS 255, an instant message (IM) 257, a browser 259, a camera 261, an alarm 263, a contact 265, a voice recognition 267, an email 269, a calendar 271, a media player 273, an album 275, or a watch 277, a health 279 (e.g., measuring the degree of workout or blood sugar), or environmental information 281 (e.g., air pressure, moisture, or temperature information). According to one or more embodiments, the application 146 may further include an information exchanging application that is configured to support or facilitate information exchange between the electronic device 101 and the external electronic device. The information exchange application may include, for example, a notification relay application for transferring designated information (e.g., a call, message, or alert) to the external electronic device or a device management application for managing the external electronic device. The notification relay application may transfer notification information corresponding to an event (e.g., receipt of an email) that occurs at another application (e.g., the email application 269) of the electronic device 101 to the external electronic device, or the notification relay application may receive notification information from the external electronic device and provide the notification information to a user of the electronic device 101. The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, deletion, or an update of an application running on the external electronic device.

Hereinafter, an example of a configuration of an electronic device (e.g., the electronic device 101 of FIG. 1) according to various embodiments is described. Since the description of the electronic device 101 described in connection with FIG. 1 may be applied to the electronic device described below, no duplicate description is given.

Figure 3:
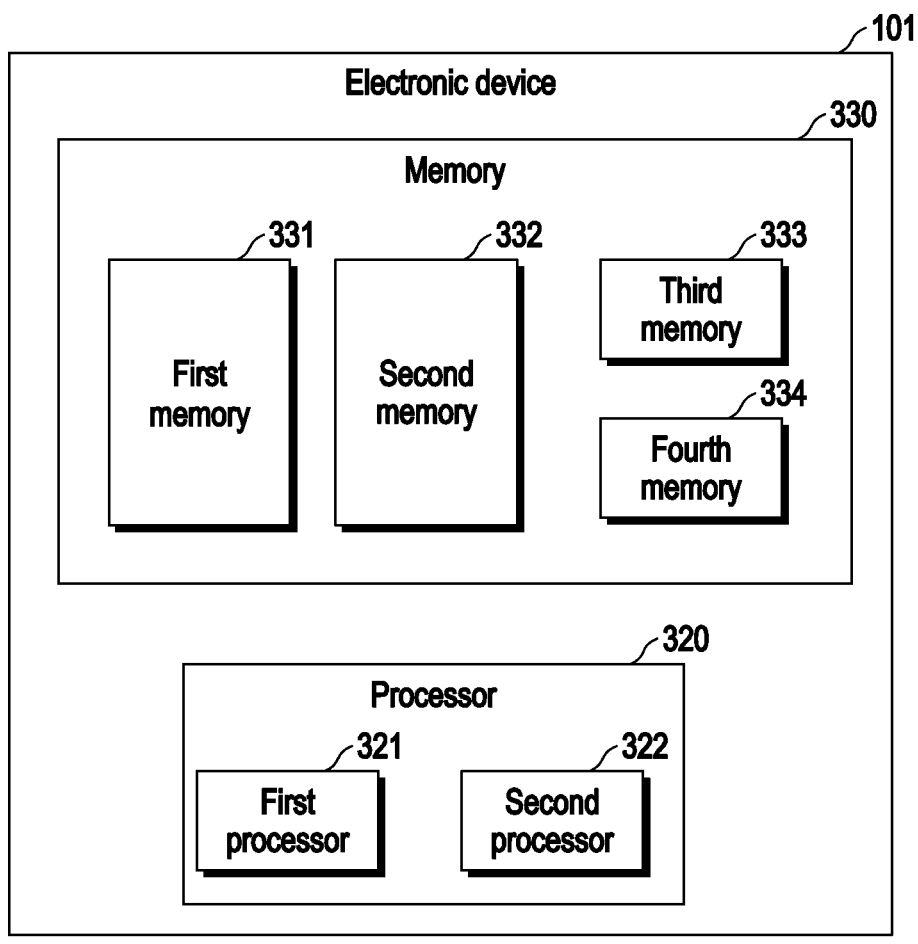
FIG. 3 is a block diagram illustrating a program module according to one or more embodiments.

FIG. 3 is a view illustrating an example of a configuration of an electronic device 101 according to one or more embodiments. However, as understood by one of ordinary skill in the art, the electronic device 101 may be implemented to include more or fewer components than those illustrated in FIG. 3. FIG. 3 is described below with reference to FIG. 4.

Figure 4:
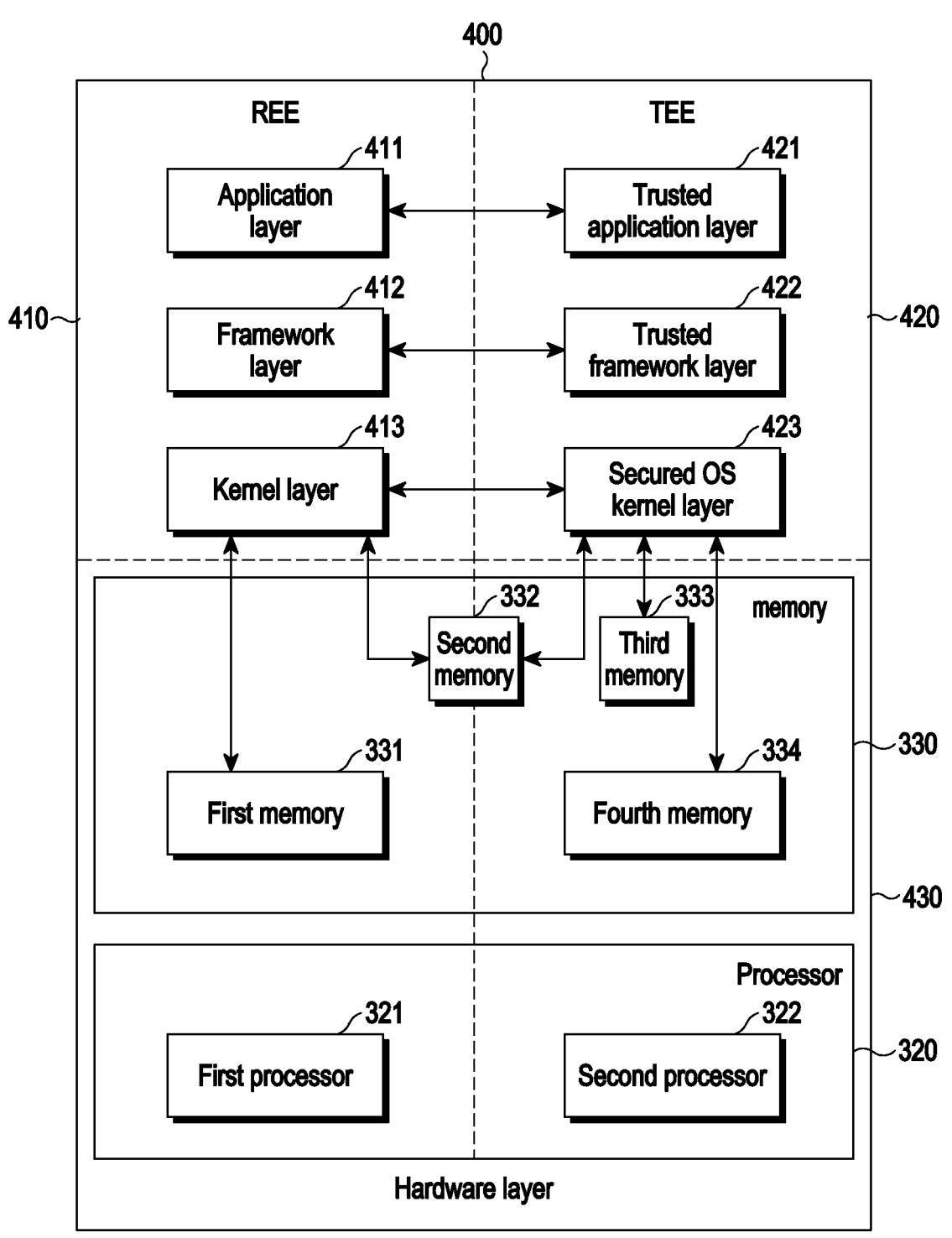
FIG. 4 is a view illustrating an example of an execution environment according to a program module of an electronic device according to one or more embodiments.

FIG. 4 is a view illustrating an example of an execution environment according to a program module of an electronic device (e.g., the electronic device 101 of FIG. 1) according to one or more embodiments.

Referring to FIG. 4, the program module 400 may include a rich execution environment (REE) 410 and a trusted execution environment (TEE) 420. The REE 410 and the TEE 420 may be divided, for example, hardware-wise or software-wise. In one or more examples, the REE 410 and the TEE 420 may be physically separated and/or separated software-wise. The REE 410 may be an environment in which a general operating system (e.g., the operating system 242 of FIG. 2) operates. For example, the Android operating system, the Windows operating system, and the Linux operating system, or any other operating system known to one of ordinary skill in the art, may operate in the REE 410. The TEE 420 may be an environment in which an operating system that is securely and safely protected, for example, a secure operating system, operates. For example, a secure operating system such as QSee of Qualcomm and Kinibi of Trustonic may operate in the TEE 420. According to one or more embodiments, an application supporting the iSIM function may operate in the TEE 420. Data processing based on a secure operating system may be performed in the TEE 420 securely and safely. The TEE 420 may be implemented in various ways such as a trust zone, a secure execution environment, a platform security processor, a trusted execution technology, software guard extensions, or any other implementation configuration known to one of ordinary skill in the art. As understood by one of ordinary skill in the art, that there is no limitation in the implementation configuration.

According to one or more embodiments, the REE 410 may include an application layer 411, a framework layer 412, and a kernel layer 413. In the application layer 411, various applications (e.g., the application 246 of FIG. 2) may operate therein. In the framework layer 412, the function supporting the operation of the application and the service provided by the operating system may operate. The kernel layer 413 may be a layer in which core functions of the operating system operate. The kernel layer 413 may control or manage system resources used to execute operations or functions implemented in other programs. Further, the kernel layer 413 may provide an interface configured to control or manage system resources by accessing individual components of the electronic device 101.

According to one or more embodiments, the TEE 420 may include a trusted application layer 421, a trusted framework layer 422, and a secured operating system (OS) kernel layer 423. In the trusted application layer 421, a trusted application may operate. According to one or more embodiments, the electronic device 101 may execute an application performing an iSIM function in the trusted application layer 421. The trusted application may generate, transmit, receive, and store data requiring security during execution of the application, which is described below in greater detail. In the trusted framework layer 422, an operating system operating in the TEE 420, for example, a secure operating system, may operate. The secured OS kernel layer 423 may be a layer in which core functions of the secure operating system operate. The secured OS kernel layer 423 may control or manage system resources used to execute an operation or function implemented in the trusted application or secure operating system.

In the hardware layer 430, various pieces of hardware (e.g., the memory 330 and the processor 320) of the electronic device 101 may operate.

The processor 320 may include a first processor 321 and a second processor 322. According to one or more embodiments, the first processor 321 and the second processor 322 may perform an operation executed in a plurality of execution environments (e.g., the REE 410 and the TEE 420) isolated from each other. For example, the plurality of execution environments may be implemented as software-wise isolated execution environments, may be implemented as hardware-wise isolated execution environments, or may be implemented as a combination of both. According to one or more embodiments, each of the first processor 321 and the second processor 322 may operate in at least one of the plurality of execution environments to perform a designated operation and/or control at least one hardware component included in the electronic device 101. According to one or more embodiments, the first processor 321 may include an application processor (AP) and may perform operations executed in the REE 410. According to one or more embodiments, the second processor 322 may include a secure processor (SP) and may perform operations executed in the TEE 420. Operations of the processor 320 (e.g., the first processor 321 and the second processor 322) described below may be performed according to execution of modules stored in the memory 330. For example, at least some of the modules may be implemented (e.g., executed) in software, firmware, or a combination of at least two thereof. For example, the modules may be implemented in the form of an application, program, computer code, instructions, routines, or processes, which are executable by the processor 320. Thus, when the modules are executed by the processor 320, the modules may trigger the processor 320 to perform operations associated with the modules (or functions that the modules may provide). Therefore, when it is described below that a specific module performs an operation, it may be interpreted as the processor 320 performing the operation as the specific module is executed. In one or more examples, the modules may be implemented as portions of a specific application. In one or more examples, without being limited to what is described and/or shown, each module may be implemented as a separate hardware device (e.g., a processor or control circuit) from the processor 320.

The memory 330 may include a first memory 331, a second memory 332, a third memory 333, and a fourth memory 334.

The first memory 331 (e.g., at least a portion of the non-volatile memory 138 of FIG. 1) may be a non-secure memory and may be a non-volatile memory. The first memory 332 may store data output from an application operating in the application layer 311 of the REE 410. In one or more embodiments, the application may be executed in the application layer 411 by the first processor 321, and the first processor 321 may store data generated while the application is executed in the first memory 332 through the kernel layer 413. In one or more embodiments, the first processor 321 may read data required while executing the application from the first memory 331 through the kernel layer 413.

The second memory 332 may be a volatile memory and may be a memory shared by the REE 410 and the TEE 420. The second memory 332 may be a dynamic random access memory (DRAM). The second memory 332 may temporarily store at least a portion of secure data output from a trusted application operating in the trusted application layer 421 under the control of the first processor 321 and the second processor 322. In one or more embodiments, the trusted application may be executed in the trusted application layer 421 by the second processor 322, the second processor 322 may send a request for data as the trusted application is executed, to the first processor 321 through the mailbox of the secured OS kernel layer 423, and the first processor 321 may read data stored in the first memory 331 through a daemon, and may temporarily store the read data in the second memory 332 as the currently executed daemon receives the request from the second processor 322 through the mailbox of the kernel layer 413. The second processor 322 may read data temporarily stored in the second memory 332 through the secured OS kernel layer 423 and may transmit the read data to the trusted application layer 421. In one or more embodiments, the trusted application may be executed in the trusted application layer 421 by the second processor 322, and the second processor 322 may store secure data generated as the trusted application is executed in the second memory 332, and may request the first processor 321 to store the secure data temporarily stored in the second memory 332 through the mailbox of the secured OS kernel layer 423. As the currently executed demon receives the request of the second processor 322 through the mailbox of the kernel layer 413, the first processor 321 may read the secure data temporarily stored in the second memory 332 through the daemon and store the read secure data in the first memory 331. The request of the second processor 322 may include the address of the second memory 332 in which the secure data is stored.

The third memory 333 may be a volatile memory (e.g., the volatile memory 132 of FIG. 1) and may have a lower storage capacity than the first memory 331. The third memory 333 may be a static random access memory (SRAM). The third memory 333 may temporarily store at least a portion of secure data output from the trusted application operating in the trusted application layer 421. In one or more embodiments, the trusted application may be executed in the trusted application layer 421 by the second processor 322, and the second processor 322 may temporarily store at least a portion of the secure data generated as the trusted application is executed in the third memory 333 through the secured OS kernel layer 423. In one or more embodiments, under the control of the second processor 322, data stored in the third memory 333 may be encrypted and may be copied (e.g., swapped out) to the second memory 332, and data stored in the second memory 332 may be decrypted and may be copied (e.g., swapped in) to the third memory 333.

In one or more embodiments, the fourth memory 334 (e.g., at least a portion of the non-volatile memory 138 of FIG. 1) may be a non-volatile memory and may be a secure memory. The fourth memory 334 may store at least a portion of secure data output from the trusted application operating in the trusted application layer 421. In one or more embodiments, the trusted application may be executed in the trusted application layer 421 by the second processor 322, and the second processor 322 may temporarily store at least a portion of the secure data generated as the trusted application is executed in the fourth memory 334 through the secured OS kernel layer 423. The fourth memory 334 may be a storage space in which the functions of reading, modifying, or deleting data are performed infrequently. The electronic device 101 may be configured to allow access to the fourth memory 334 only for a specific instruction set. For example, data of the fourth memory 334 may be read, modified, or deleted according to an instruction from the trusted application. Further, data of the fourth memory 334 may not be read, modified, or deleted according to instructions from a general application other than the trusted application. According to one or more embodiments, information used while encrypting the secure data may be stored in the fourth memory 334. Information stored in the fourth memory 334 may be used to decrypt later encrypted secure data. This is described below in greater detail.

According to one or more embodiments, the electronic device 101 may be implemented to perform an operation (or function) in a plurality of execution environments based on pieces of hardware (e.g., the memories 331 to 334 and/or the processors 321 and 322) implemented independently of each other. According to one or more embodiments, a difference piece of hardware associated with a different authority may be allocated for each of a plurality of execution environments (e.g., the REE 410 and the TEE 420). For example, referring to FIG. 4, hardware devices positioned on the left side of the dashed line may be allocated to the REE 410 (or driven in the REE 410), and hardware devices positioned on the right side may be allocated to the TEE 420 (or driven in the TEE 420). For example, referring to FIG. 4, different memories 331 to 334 may be allocated for each of a plurality of execution environments (e.g., the REE 410 and the TEE 420). The first processor 321 may execute a first operating system in the REE 410 to perform at least one operation, and may read and write data from/to the first memory 331 allocated to the REE 410. The second processor 322 may execute a second operating system separate and independent from the first operating system of the REE 410 in the TEE 420 to perform at least one operation, and may read and write data from/to the third memory 323 and the fourth memory 334 allocated to the TEE 420. According to one or more embodiments, the authority and/or security for the TEE 420 may be higher than the authority and/or security for the REE 410. In one or more examples, the second processor 322 may access the first memory 331 allocated to the REE 410 from the TEE 420 to read and write data, but the first processor 321 may be restricted from accessing the fourth memory 334 allocated to the TEE 420 in the REE 410. For example, the first processor 321 may not be able to write data in the fourth memory 334 or read data stored in the fourth memory 334. According to one or more embodiments, the REE 410 and the TEE 420 may be allowed to access the second memory 332. For example, the first processor 321 may write data in the second memory 332 or read data stored in the second memory 332 in the REE 410. For example, the second processor 322 may write data in the second memory 332 or read data stored in the second memory 332 in the TEE 420.

Hereinafter, an example of an operation of the electronic device 101 according to one or more embodiments is described.

According to one or more embodiments, the electronic device 101 may encrypt the secure data generated by the execution of the trusted application in the TEE 420, store the encrypted secure data in the form of a file in the first memory 331 allocated to the REE 410 through the second memory 332, and store information used to encrypt and/or decrypt the secure data in the fourth memory 334. According to one or more embodiments, the electronic device 101 may read the encrypted secure data stored in the file form in the first memory 331 allocated to the REE 410 through the currently executed daemon, copy the read secure data in the second memory 332, read secure information used to encrypt and/or decrypt the secure data from the fourth memory 334, decrypt the encrypted secure data copied to the second memory 332 using secure information and temporarily store the decrypted secure data in the third memory 333, and use the decrypted secure data while the trusted application is executed.

Figure 5:
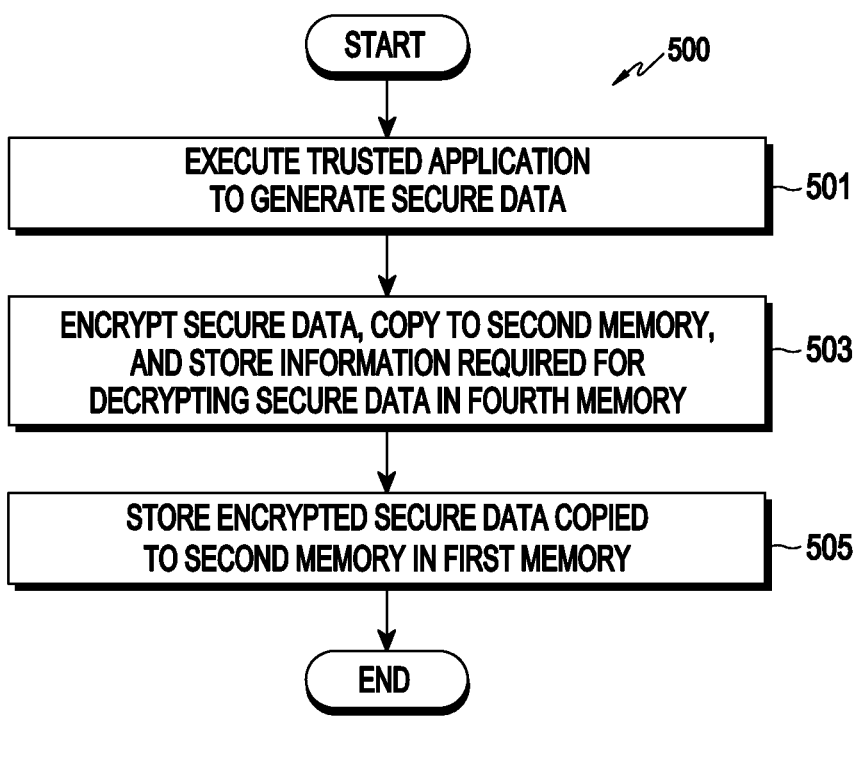
FIG. 5 is a flowchart illustrating an example of an operation of an electronic device according to one or more embodiments.

FIG. 5 is a flowchart 500 illustrating an example of an operation of an electronic device 101 according to one or more embodiments. As understood by one of ordinary skill in the art, the operations shown in FIG. 5 are not limited to the shown order, and may be performed in other various orders. Further, according to one or more embodiments, more or less operations than those of FIG. 5 may be performed. FIG. 5 is described below with reference to FIG. 6.

According to one or more embodiments, the electronic device 101 (e.g., the second processor 322) may generate secure data by executing the trusted application in the trusted application layer 421 of the TEE 420 in operation 501. For example, when iSIM is executed among trusted applications, the generated data may include at least one of information requiring security, such as subscriber identification information, an authentication key, a subscriber phone number, a local area ID, a personal identification number (PIN), and service provider information. According to one or more embodiments, the secure data may vary depending on the executed application, and may include information designated by the corresponding application developer. The electronic device 101 (e.g., the second processor 322) may temporarily store secure data (e.g., 631 of FIG. 6) generated by executing the trusted application in the third memory 333 through the secured OS kernel layer 423.

Figure 6:
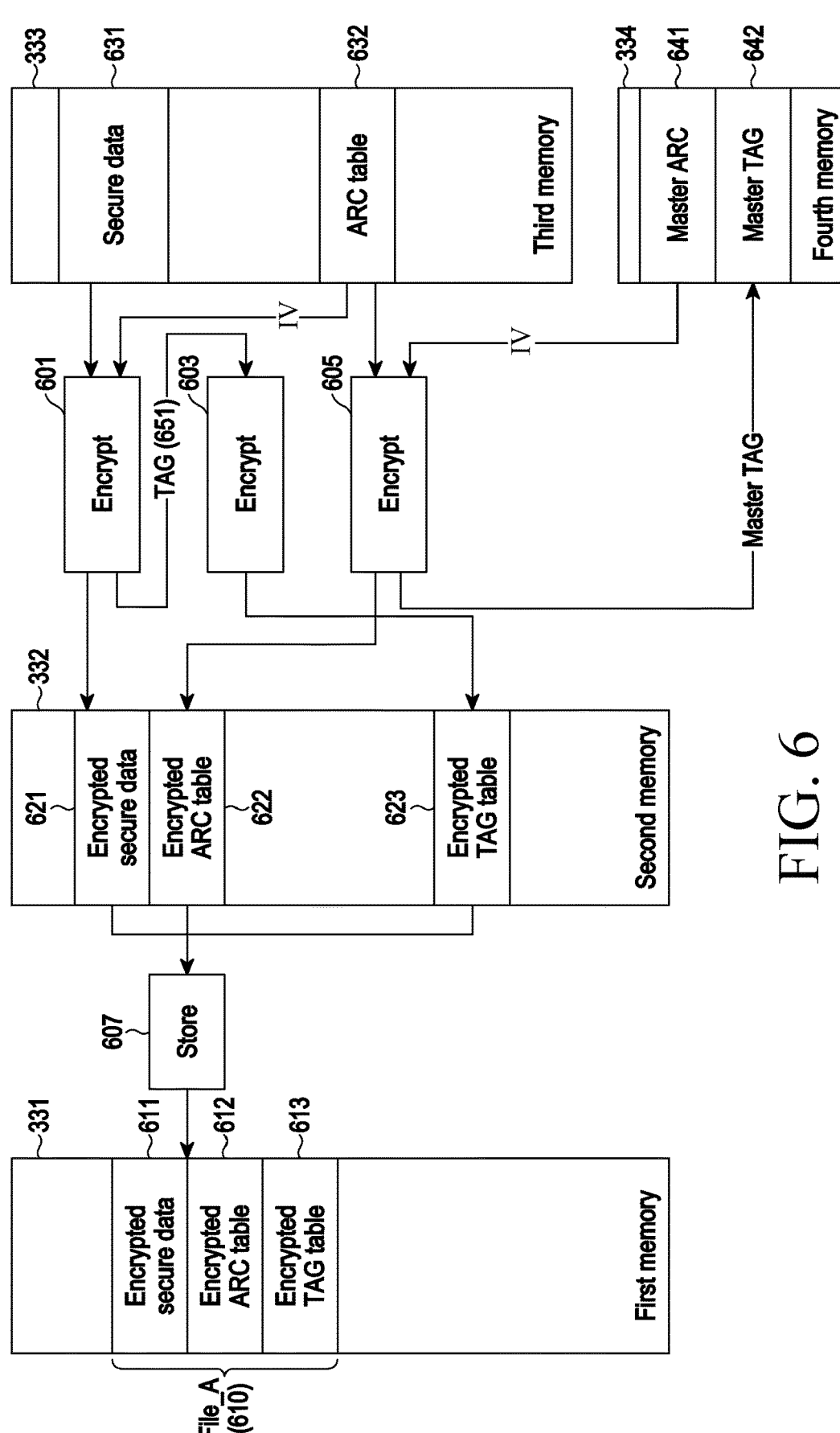
FIG. 6 is a view illustrating an example of the operation of the electronic device of FIG. 5 according to one or more embodiments.

In operation 503, the electronic device 101 (e.g., the second processor 322) may encrypt (e.g., 601 of FIG. 6) the secure data, or a portion thereof, being used in the trusted application and may copy (e.g., swap out) the encrypted secure data to the second memory 332 through the secured OS kernel layer 423 (e.g., 621 of FIG. 6). In one or more embodiments, an advanced encryption standard (AES)-galois/counter mode (GCM) may be used to encrypt data. The encryption method is not limited thereto, and other encryption methods known to one of ordinary skill in the art that guarantee confidentiality and integrity may be used. In one or more embodiments, data encryption may be performed in units of blocks obtained by splitting data into predetermined sizes. When encrypting data in block units, a technique for preventing rollback may be used. As understood by one of ordinary skill in the art, rollback of encrypted data may include changing the encrypted data to a previous form such as unencrypted data. According to one or more embodiments, an anti-replay counter (ARC) may be used to prevent rollback. Different ARC values may be used for each data block to prevent rollback. Different ARC values used for each data block may be temporarily stored in the third memory 333 in a table form. In one or more embodiments, different ARC values used for each data block may be temporarily stored in the third memory 333 in the form of a table (632 of FIG. 6). The ARC table may be a linear array composed of ARC values. The number of ARC values may be determined according to the size of the secure data that is copied (e.g., swapped out) to the second memory 332. For example, 256 ARC values may be used to encrypt 2 MB of secure data and copy (e.g., swap out) the encrypted secure data to the second memory 332. In one or more examples, each ARC value may be increased by 1 from a predetermined initial value. In one or more embodiments, when the secure data is copied (e.g., swapped out) to the second memory 332 or is copied (e.g., swapped in) from the second memory 332, the corresponding ARC value may be used as an initial vector (IV) for encryption or decryption of the secure data. In one or more embodiments, the IV may be calculated by the following equation.

$$IV = \text{device specific value} + ARC + \text{zero padding} \qquad \text{Eq. 1}$$

In the above equation, the device specific value is a value unique to the electronic device and may be configured as 4 bytes. ARC may be configured as 8 bytes, and IV may be configured as 16 bytes including 4 bytes of zero padding.

The electronic device 101 (e.g., the second processor 322) may encrypt parameter values generated while encrypting data on a per-block basis and store the encrypted parameter values in the second memory 332 through the secured OS kernel layer 423. According to one or more embodiments, while encrypting data using the AES-GCM, a tag TAG (e.g., 651 of FIG. 6) may be generated for each data block, and the electronic device 101 (e.g., the second processor 322) may encrypt the tags generated in the encryption process in the form of a table (e.g., 603 of FIG. 6) and store (e.g., swap out) the encrypted tags in the second memory 332 through the secured OS kernel layer 423 (e.g., 623 of FIG. 6). In one or more embodiments, an electronic code block (AES-ECB) mode may be used to encrypt the tag. The encryption method is not limited thereto, and other encryption methods known to one of ordinary skill in the art that guarantee confidentiality may be used.

In one or more embodiments, the electronic device 101 (e.g., the second processor 322) may encrypt information generated during a data encryption process and stored in the third memory 333, and may copy (e.g., swap out) the encrypted information to the second memory 332 through the secured OS kernel layer 423. In one or more embodiments, the electronic device 101 (e.g., the second processor 322) may encrypt (e.g., 605 of FIG. 6) the ARC table stored in the third memory 333 and may copy (e.g., swap out) the encrypted ARC table to the second memory 332 through the secured OS kernel layer 423 (e.g., 622 of FIG. 6). In one or more embodiments, AES-GCM may be used to encrypt the ARC table. The encryption method is not limited thereto, and other encryption methods known to one of ordinary skill in the art that guarantee confidentiality and integrity may be used. In one or more embodiments, the electronic device 101 (e.g., the second processor 322) may store the parameters used and generated when encrypting the pieces of information generated in the encryption process in the fourth memory 334 through the secured OS kernel 423. In one or more embodiments, when encrypting the ARC table, the electronic device 101 (e.g., the second processor 322) may use the master ARC as the initial vector (IV). The master ARC may be generated as a random value whenever the secure data generated from the trusted application is stored. In one or more examples, the master ARC may be used to decrypt the encrypted ARC table. For example, the electronic device 101 (e.g., the second processor 322) may store the master ARC in the fourth memory 334 through the secured OS kernel layer 423 (e.g., 641 of FIG. 6). In one or more embodiments, a master tag may be generated while encrypting the ARC table. The master tag may be used to decrypt the encrypted ARC table. For example, the electronic device 101 (e.g., the second processor 322) may store the master tag in the fourth memory 334 through the secured OS kernel layer 423 (e.g., 642 of FIG. 6).

In operation 505, the electronic device 101 (e.g., the first processor 321) may store encrypted data stored in the second memory 332 in the first memory 331 allocated to the REE 410. In one or more embodiments, the second processor 322 of the electronic device 101 may request the first processor 321 to store the secure data in the first memory 331 allocated to the REE 410 through the mailbox of the secured OS kernel layer 423. The first processor 321 of the electronic device 101 may receive the request for secure data from the second processor 322 through the mailbox of the kernel layer 413 while the daemon is being executed in the REE 410. In one or more embodiments, the request transmitted from the second processor 322 to the first processor 321 may include the address of the second memory 332 in which the secure data is stored. The first processor 321 of the electronic device 101 may read encrypted data stored in the second memory 332 through the daemon running in the REE 410, and may store the encrypted data read through the kernel layer 413 in the first memory 331 (e.g., 607 of FIG. 6). In one or more embodiments, the encrypted data stored in the second memory 332 may include the encrypted secure data (e.g., 611 of FIG. 6), the encrypted ARC table (e.g., 612 of FIG. 6), and the encrypted tag table (e.g., 613 of FIG. 6), and the encrypted data may be stored in the first memory 331 in the form of one file (e.g., 610 of FIG. 6).

Figure 7:
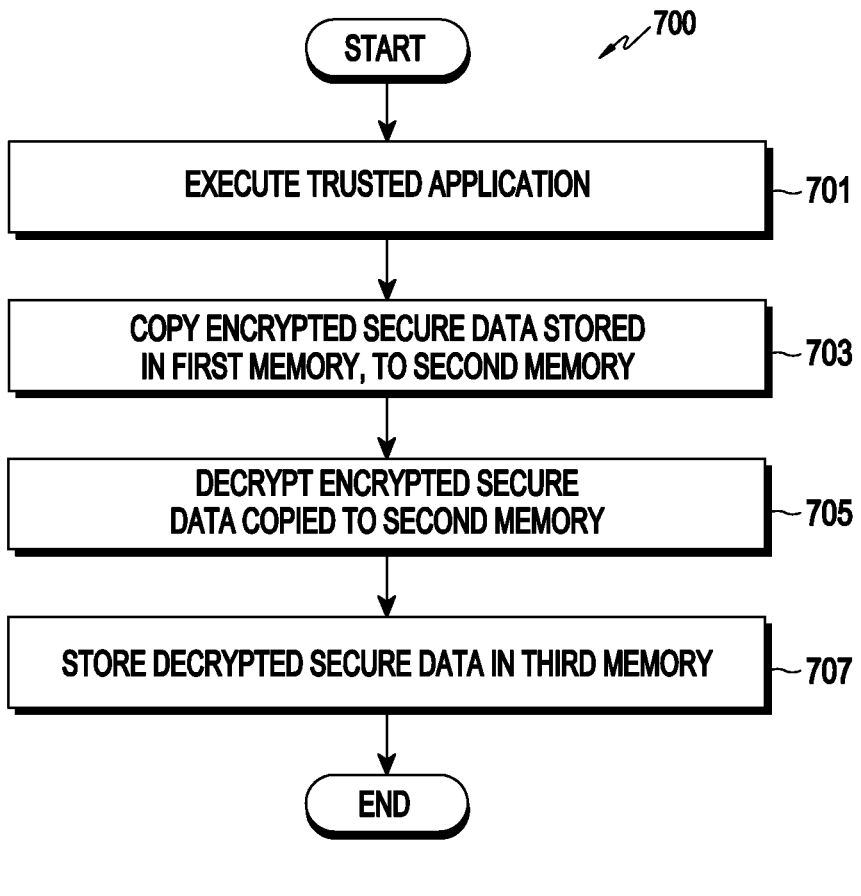
FIG. 7 is a flowchart illustrating an example of an operation of an electronic device according to one or more embodiments.

FIG. 7 is a flowchart 700 illustrating an example of an operation of an electronic device 101 according to one or more embodiments. As understood by one of ordinary skill in the art, the operations shown in FIG. 7 are not limited to the shown order, and may be performed in other various orders. Further, according to one or more embodiments, more or less operations than those of FIG. 7 may be performed. FIG. 7 is described below with reference to FIG. 8.

According to one or more embodiments, the electronic device 101 (e.g., the second processor 322) may execute the trusted application in the trusted application layer 421 of the TEE 420 in operation 701. In one or more embodiments, as the trusted application is executed, the second processor 322 may request the secure data stored in the first memory 331 from the first processor 321 through the mailbox of the secured OS kernel 423.

Figure 8:
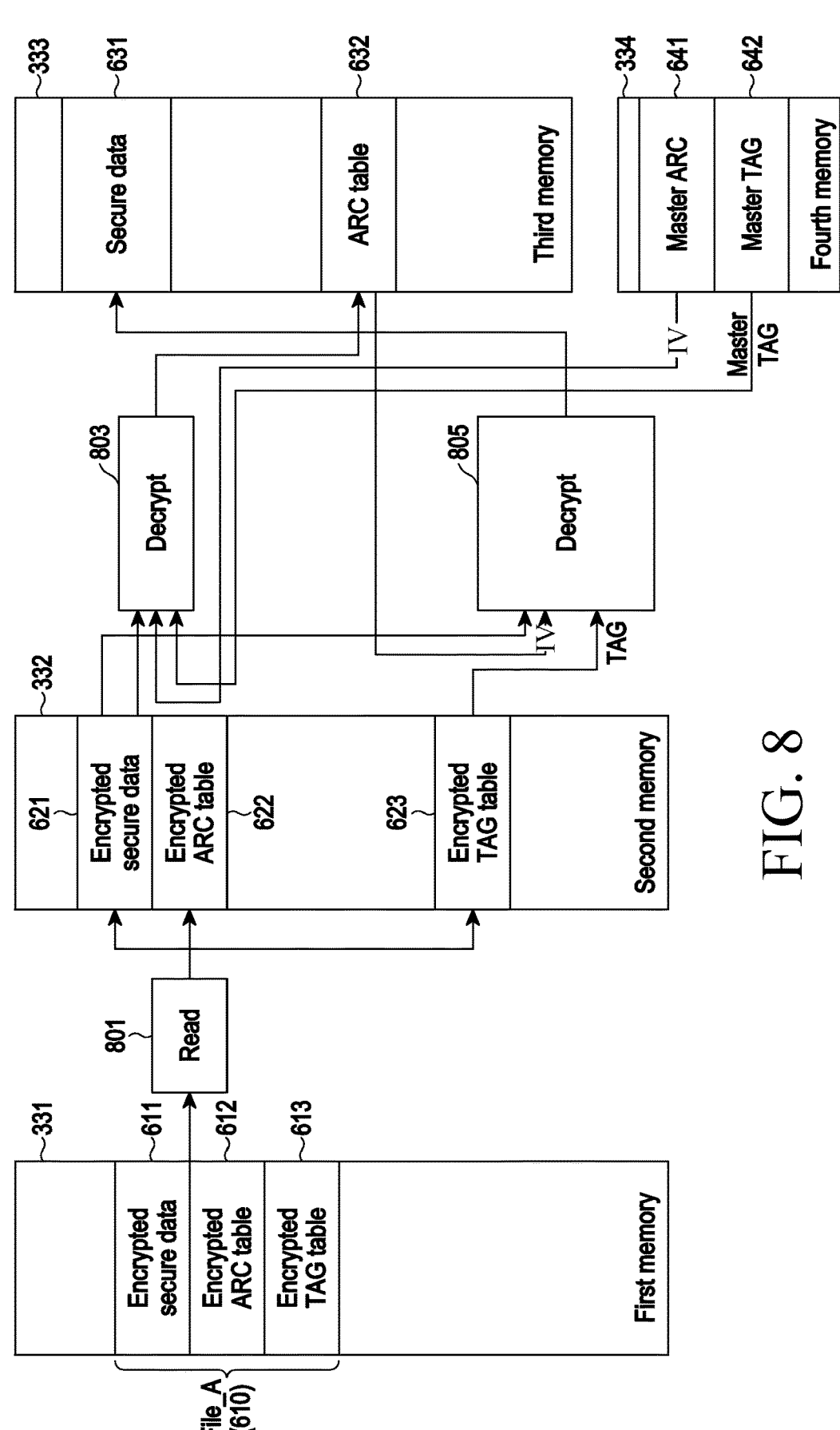
FIG. 8 is a view illustrating an example of the operation of the electronic device of FIG. 7 according to one or more embodiments.

In operation 703, the electronic device 101 (e.g., the first processor 321) may read the encrypted data file (e.g., 610 of FIG. 8) stored in the first memory 331 (e.g., 801 of FIG. 8). In one or more embodiments, when the first processor 321 receives the secure data request from the second processor 322 through the mailbox of the kernel layer 413, the first processor 321 may read the encrypted data file (e.g., 610 of FIG. 8) stored in the second memory 332 through the daemon running in the REE 410 (e.g., 801 of FIG. 8). According to one or more embodiments, when AES-GCM is used as an encryption scheme for secure data and ARC is used to prevent rollback, encrypted data (e.g., 611 of FIG. 8), an encrypted ARC table (e.g., 612 of FIG. 8), and an encrypted tag table (e.g., 613 of FIG. 8) may be stored in the first memory 331. In this case, the electronic device 101 (e.g., the first processor 321) may copy the encrypted data (e.g., 611 of FIG. 8), the encrypted ARC table (e.g., 612 of FIG. 8), and the encrypted tag table (e.g., 613 of FIG. 8) included in the file read from the first memory 331 to the second memory 332. In one or more embodiments, the first processor 321 may copy the encrypted data (e.g., 611 of FIG. 8), the encrypted ARC table (e.g., 612 of FIG. 8), and the encrypted tag table (e.g., 613 of FIG. 8) included in a file read from the first memory 331 to the second memory 332 through the daemon running in the REE 410.

In operation 705, the electronic device 101 (e.g., the second processor 322) may decrypt the encrypted data (e.g., 611 of FIG. 8) copied to the second memory 332 to be used in the trusted application. In one or more embodiments, the electronic device 101 (e.g., the second processor 322) may decrypt each of the encrypted data (e.g., 411 of FIG. 6), the encrypted ARC table (e.g., 612 of FIG. 8), and the encrypted tag table (e.g., 613 of FIG. 8). In one or more embodiments, the electronic device 101 (e.g., the second processor 322) may verify and decrypt the encrypted data generated in the encryption process using the encryption information stored in the fourth memory 334. In one or more embodiments, the electronic device 101 (e.g., the second processor 322) may decrypt (e.g., 803 of FIG. 8) the encrypted ARC table (e.g., 622 of FIG. 8). In one or more embodiments, when the ARC table is encrypted with AES-GCM while encrypting the secure data, the master ARC (e.g., 641 of FIG. 8) and the master tag (e.g., 642 of FIG. 8) generated and used in the encryption process are stored in the fourth memory 334. In one or more embodiments, the second processor 322 may read the master ARC (e.g., 641 of FIG. 8) and the master tag (e.g., 642 of FIG. 8) stored in the fourth memory 334 through the secured OS kernel layer 423, and may decrypt (e.g., 803 of FIG. 8) the encrypted ARC table (e.g., 622 of FIG. 8) stored in the second memory 332 using the master ARC (e.g., 641 of FIG. 8) and the master tag (e.g., 642 of FIG. 8). According to one or more embodiments, the master tag may be used to verify the encrypted ARC table. The electronic device 101 (e.g., the second processor 322) may store (e.g., swap in) the decoded ARC table in the third memory 333 through the secured OS kernel layer 423 (e.g., 632 of FIG. 8).

The electronic device 101 (e.g., the second processor 322) may decrypt the encrypted secure data using the decrypted information. In one or more embodiments, the electronic device 101 (e.g., the second processor 322) may decrypt the encrypted secure data (e.g., 621 of FIG. 8) copied to the second memory 332 on a per-block basis, using the ARC values of the decrypted ARC table (e.g., 632 of FIG. 8) and the tag values of the decrypted tag table (e.g., 623 of FIG. 8) copied to the second memory 332 (e.g., 805 of FIG. 8). For example, the data may be divided into one or more blocks, where the data is encrypted in on a per block basis, and subsequently decrypted on the per-block basis.

In one or more embodiments, the electronic device 101 (e.g., the second processor 322) may store (e.g., swap in) the decoded secure data in the third memory 333 through the secured OS kernel layer 423 (e.g., 631 of FIG. 8). Thereafter, the electronic device 101 (e.g., the second processor 322) may use decoded secure data stored in the third memory 333 through the trusted application running in the trusted application layer 421 of the TEE 420.

Figure 9:
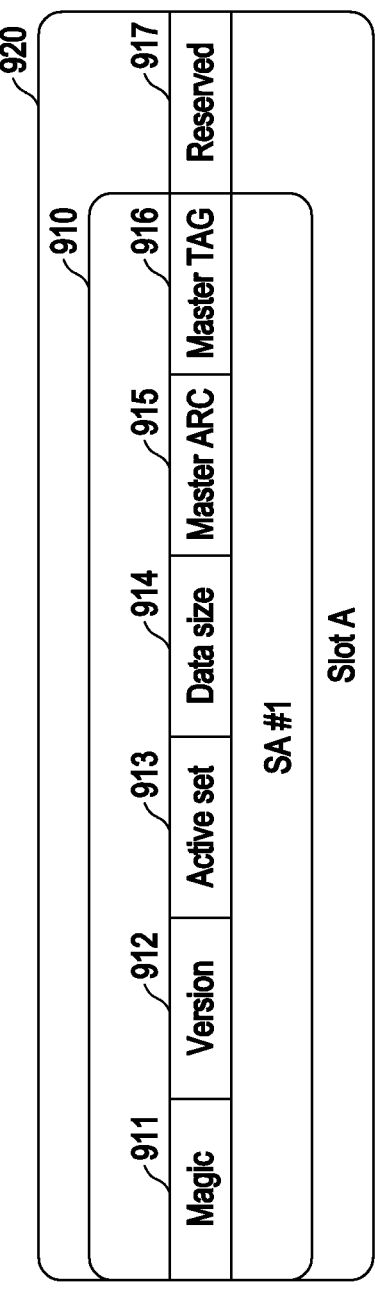
FIG. 9 is a view illustrating an example of a format of secure data stored in a memory of an electronic device according to one or more embodiments.

FIG. 9 is a view illustrating an example of a format of secure data stored in a fourth memory 334 of an electronic device 101 according to one or more embodiments.

In one or more embodiments, the fourth memory 334 may store at least a portion of secure data output from the trusted application operating in the trusted application layer 421. In one or more embodiments, the trusted application may be executed in the trusted application layer 421 by the second processor 322, and the second processor 322 may temporarily store at least a portion of the secure data generated as the trusted application is executed in the fourth memory 334 through the secured OS kernel layer 423. According to one or more embodiments, information used while encrypting the secure data may be stored in the fourth memory 334.

Referring to FIG. 9, data 910 generated by execution of trusted application number 1 SA #1 may be stored in slot A 920 of the fourth memory 334. According to one or more embodiments, data including a master ARC field 915 used as an initial vector (IV) when the second processor 322 encrypts the ARC table and a master tag field 916 generated while encrypting the ARC table may be stored in the fourth memory 334. In addition to the master ARC field 915 and the master tag field 916, the data stored in the fourth memory 334 may further include a magic field 911, a version field 912, an active set field 913, a data size field 914, and a reserved field 917.

The magic field 911 may be formed of 4 bytes and may be an integer used to identify the instruction. The version field 912 may be formed of 4 bytes and may be a value indicating version information about the corresponding data. The active set field 913 may be formed of 4 bytes, and may be a flag value indicating the set in which correct information is stored. The data size field 914 may be formed of 4 bytes and may be a value indicating the size of secure data generated by the corresponding trusted application. The master ARC field 915 may be formed of 8 bytes, and the master ARC may be a random value generated whenever secure data generated from the trusted application is stored. The master ARC may be used as the initial vector (IV) when encrypting the ARC table or decrypting the encrypted ARC table. The master tag field 916 may be formed of 16 bytes, and the master tag may be an authentication tag generated as a result of encryption when the ARC table is encrypted and copied (e.g., swapped out) to the second memory 332. The master tag may be used as an authentication tag when decrypting the encrypted ARC table.

An electronic device according to one or more embodiments may comprise a first processor 321 operating in a general environment 410; a second processor 322 operating in a secure environment 420; a first memory 331 allocated to the general environment; a second memory 334 allocated to the secure environment; and a third memory 332 shared in the general environment and the secure environment. The second processor may be configured to encrypt at least a portion of the secure data generated by a reliable application executed in the secure environment and store it in the third memory and store first information used to encrypt at least a portion of the secure data and second information generated while encrypting the at least the portion of the secure data in the second memory. The first processor may be configured to store the encrypted at least the portion of the secure data stored in the third memory in the first memory.

In one or more embodiments, the second processor may be configured to encrypt the at least the portion of the secure data on a per-block basis using a different anti-replay counter ARC value for each block, encrypt an ARC table 432 storing the ARC values, and encrypt a tag table storing tag values 651 generated while encrypting the at least the portion of the secure data on a per-block basis.

In one or more embodiments, the first processor may be configured to store the encrypted at least the portion of the secure data 611, the encrypted ARC table 612, and the encrypted tag table 613 in a file form 610 in the first memory.

In one or more embodiments, the first information may be a master ARC 641, and the second information may be a master tag 642.

In one or more embodiments, the first processor may be configured to copy the encrypted at least the portion of the secure data stored in the first memory and store the copied portion in the third memory as the trusted application is executed in the secure environment, and the second processor may be configured to decrypt the encrypted at least the portion of the secure data stored in the third memory using the first information and the second information.

In one or more embodiments, the encrypted at least the portion of the secure data stored in the third memory may include an encrypted ARC table 622 storing anti-replay counter ARC values used while encrypting the at least the portion of the secure data on a per-block basis and an encrypted tag table 623 storing tag values generated while encrypting the at least the portion of the secure data on a per-block basis. The second processor may be configured to decrypt the encrypted ARC table using the first information and the second information, decrypt the tag table, and decrypt the at least the portion of the secure data encrypted on a per-block basis, using the decrypted ARC table and the decrypted tag table.

In one or more embodiments, the first processor may be configured to read a file 610 including the encrypted secure data, the encrypted ARC table, and the encrypted tag table from the first memory, store the encrypted secure data, the encrypted ARC table, and the encrypted tag table separately in the third memory.

In one or more embodiments, the second processor may be configured to encrypt the at least the portion of the secure data and the ARC table in an advanced encryption standard (AES)-galois/counter mode (GCM) scheme.

In one or more embodiments, the second processor may be configured to decrypt the encrypted at least the portion of the secure data in an advanced encryption standard (AES)-galois/counter mode (GCM) scheme.

In one or more embodiments, the second processor may be configured to encrypt the tag table in an advanced encryption standard (AES)-electronic code block (ECB) scheme.

A method for operating an electronic device 101 according to one or more embodiments may comprise executing 501 a trusted application in a secure environment and generating secure data by a first processor 322 operating in the secure environment 420. The method may comprise encrypting 503 at least a portion of the generated secure data and storing the encrypted portion in a first memory 332 shared in the secure environment and a general environment 410 by the first processor. The method may comprise storing 503 first information used to encrypt the at least the portion of the secure data and second information generated while encrypting the at least the portion of the secure data in a second memory allocated to the secure environment by the first processor. The method may comprise storing 505 the encrypted at least the portion of the secure data stored in the first memory in a third memory allocated to the general environment by a second processor 321 operating in the general environment.

In one or more embodiments, encrypting 503 may include by the first processor, encrypting 601 the at least the portion of the secure data on a per-block basis using a different anti-replay counter ARC value for each block, encrypting 603 a tag table storing tag values generated while encrypting the at least the portion of the secure data on a per-block basis, and encrypting 605 an ARC table storing the ARC values.

In one or more embodiments, storing 505 in the third memory may include, by the second processor, storing 607 the encrypted at least the portion of the secure data, the encrypted ARC table, and the encrypted tag table in a file form 610 in the first memory.

In one or more embodiments, the first information may be a master ARC 641, and the second information may be a master tag 642.

In one or more embodiments, the method may further comprise copying 703 the encrypted at least the portion of the secure data stored in the first memory and storing the copied portion in the first memory by the second processor as the trusted application is executed 701 in the secure environment and decrypting 705 the encrypted at least the portion of the secure data stored in the first memory using the first information and the second information by the first processor.

In one or more embodiments, the encrypted at least the portion of the secure data stored in the first memory may include an encrypted ARC table 621 storing anti-replay counter ARC values used while encrypting the at least the portion of the secure data on a per-block basis and an encrypted tag table 623 storing tag values generated while encrypting the at least the portion of the secure data on a per-block basis. The decrypting 705 may include, by the first processor, decrypting 803 the encrypted ARC table using the first information and the second information, decrypting 805 the tag table, and decrypting 805 the at least the portion of the secure data encrypted on a per-block basis, using the decrypted ARC table and the decrypted tag table.

In one or more embodiments, the method may further comprise, by the second processor, reading 801 a file 610 including the encrypted secure data, the encrypted ARC table, and the encrypted tag table from the third memory, storing the encrypted secure data 621, the encrypted ARC table 622, and the encrypted tag table 623 separately in the first memory.

In one or more embodiments, encrypting 601 or 605 may encrypt the at least the portion of the secure data and the ARC table in an advanced encryption standard AES-galois/counter mode GCM scheme.

In one or more embodiments, decrypting 705 may decrypt the encrypted at least the portion of the secure data in an advanced encryption standard AES-galois/counter mode GCM scheme.

In one or more embodiments, encrypting 603 the tag table may encrypt the tag table in an advanced encryption standard AES-electronic code block ECB scheme.

The electronic device according to one or more embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to one or more embodiments of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one or more embodiments, the module may be implemented in a form of an application-specific integrated circuit (ASIC).

One or more embodiments of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one or more embodiments, a method according to one or more embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities. Some of the plurality of entities may be separately disposed in different components. According to one or more embodiments, one or more of the above-described components may be omitted, or one or more other components may be added. Alternatively or Further, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a first processor operating in a general non-secure environment;
   a second processor operating in a secure environment;
   a first memory allocated to the general non-secure environment;
   a second memory allocated to the secure environment; and
   a third memory shared in the general non-secure environment and the secure environment,
   wherein the second processor is configured to:
   encrypt at least a portion of secure data to generate an encrypted portion, the secure data generated by a trusted application executed in the secure environment, store the encrypted portion in the third memory, and
store first information used to encrypt the at least the portion of the secure data and second information generated while encrypting the at least the portion of the secure data in the second memory, and
request the secure data to the first processor as the trusted application is executed in the secure environment, and
wherein the first processor is configured to,
store, in the first memory, the encrypted portion stored in the third memory,
based on the request from the second processor, copy the encrypted portion in the first memory as a copied portion and store the copied portion in the third memory, and
wherein the second processor is configured to decrypt the copied portion in the third memory using the first information and the second information.

2. The electronic device of claim 1, wherein the second processor is configured to:
   encrypt the at least the portion of the secure data on a per-block basis using a different anti-replay counter (ARC) value for each block;
   encrypt an ARC table storing the ARC value for each block; and
   encrypt a tag table storing tag values generated while encrypting the at least the portion of the secure data on the per-block basis.

3. The electronic device of claim 2,
   wherein the first processor is configured to store the encrypted at least the portion of the secure data, the encrypted ARC table, and the encrypted tag table in a file form in the first memory.

4. The electronic device of claim 2,
   wherein the first information is a master ARC, and the second information is a master tag.

5. The electronic device of claim 1,
   wherein the encrypted portion stored in the third memory includes (i) an encrypted ARC table storing anti-replay counter (ARC) values used while encrypting the at least the portion of the secure data on a per-block basis and (ii) an encrypted tag table storing tag values generated while encrypting the at least the portion of the secure data on the per-block basis, and
   wherein the second processor is configured to:
   decrypt the encrypted ARC table using the first information and the second information,
   decrypt the encrypted tag table, and
   decrypt the encrypted portion using the decrypted ARC table and the decrypted tag table.

6. The electronic device of claim 1,
   wherein the first processor is configured to read a file including the encrypted portion, the encrypted ARC table, and the encrypted tag table from the first memory, store the encrypted portion, the encrypted ARC table, and the encrypted tag table separately in the third memory.

7. The electronic device of claim 2,
   wherein the second processor is configured to encrypt the at least the portion of the secure data and the ARC table in an advanced encryption standard (AES)-galois/counter mode (GCM) scheme.

8. The electronic device of claim 1,
   wherein the second processor is configured to decrypt the encrypted portion in an advanced encryption standard (AES)-galois/counter mode (GCM) scheme.

9. The electronic device of claim 2, wherein the second processor is configured to encrypt the tag table in an advanced encryption standard (AES)-electronic code block (ECB) scheme.

10. A method for operating an electronic device, the method comprising:

executing a trusted application in a secure environment and generating secure data by a first processor operating in the secure environment;

encrypting, by the first processor, at least a portion of the generated secure data to generate an encrypted portion and storing the encrypted portion in a first memory shared in the secure environment and a general non-secure environment;

storing, by the first processor, first information used to encrypt the at least the portion of the secure data and second information generated while encrypting the at least the portion of the secure data in a second memory allocated to the secure environment;

storing, by a second processor operating in the general non-secure environment, the encrypted portion stored in the first memory in a third memory allocated to the general non-secure environment;

requesting, by the second processor, the secure data to the first processor as the trusted application is executed in the secure environment;

based on the request from the second processor, copying, by the first processor, the encrypted portion in the first memory as a copied portion and store the copied portion in the third memory; and decrypting, by the second processor, the copied portion in the third memory using the first information and the second information.

11. The method of claim 10, wherein the encrypting by the first processor includes:

encrypting the at least the portion of the secure data on a per-block basis using a different anti-replay counter (ARC) value for each block;

encrypting a tag table storing tag values generated while encrypting the at least the portion of the secure data on the per-block basis; and encrypting an ARC table storing the ARC value for each block.

12. The method of claim 11, wherein the storing by the second processor in the third memory includes, storing the encrypted portion, the encrypted ARC table, and the encrypted tag table in a file form in the first memory.

13. The method of claim 11, wherein the first information is a master ARC, and the second information is a master tag.

14. The method of claim 10, wherein the encrypted portion stored in the first memory includes (i) an encrypted ARC table storing anti-replay counter (ARC) values used while encrypting the at least the portion of the secure data on a per-block basis and (ii) an encrypted tag table storing tag values generated while encrypting the at least the portion of the secure data on the per-block basis, and wherein the decrypting by the first processor includes:

decrypting the encrypted ARC table using the first information and the second information;

decrypting the tag table; and decrypting the encrypted portion using the decrypted ARC table and the decrypted tag table.

15. The method of claim 10, further comprising, reading, by the second processor, a file including the encrypted portion, the encrypted ARC table, and the encrypted tag table from the third memory, storing the encrypted portion, the encrypted ARC table, and the encrypted tag table separately in the first memory.

16. The method of claim 11, wherein the encrypting encrypts the at least the portion of the secure data and the ARC table in an advanced encryption standard (AES)-galois/counter mode (GCM) scheme.

17. The method of claim 10, wherein the decrypting decrypts the encrypted portion in an advanced encryption standard (AES)-galois/counter mode (GCM) scheme.

18. The method of claim 11, wherein the encrypting the tag table encrypts the tag table in an advanced encryption standard (AES)-electronic code block (ECB) scheme.

* * * * *